US012596792B2

(12) United States Patent
Veprinsky et al.

(10) Patent No.: US 12,596,792 B2
(45) Date of Patent: Apr. 7, 2026

(54) DATA ENCRYPTION DETECTION

(71) Applicant: HEWLETT PACKARD ENTERPRISE DEVELOPMENT LP, Houston, TX (US)

(72) Inventors: Alex Veprinsky, San Jose, CA (US); Charles F. Clark, Roseville, CA (US); John Blumenthal, San Jose, CA (US); Ayman Abouelwafa, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 288 days.

(21) Appl. No.: 17/700,958

(22) Filed: Mar. 22, 2022

(65) Prior Publication Data

US 2023/0306108 A1      Sep. 28, 2023

(51) Int. Cl.
G06N 20/00      (2019.01)
G06F 21/55      (2013.01)

(52) U.S. Cl.
CPC ...... G06F 21/552 (2013.01); G06F 2221/034 (2013.01)

(58) Field of Classification Search
CPC ............. G06F 21/552; G06F 2221/034; G06F 21/602; G06F 11/3476; G06F 21/604; G06N 20/00
See application file for complete search history.

(56) References Cited

U.S. PATENT DOCUMENTS

| | | | |
|---|---|---|---|
| 8,332,687 B1 * | 12/2012 | Natanzon | ............ G06F 11/1471 714/6.32 |
| 8,688,620 B2 * | 4/2014 | Viswanathan | ........ G06F 11/076 706/62 |
| 8,832,037 B2 | 9/2014 | Boldo et al. | |
| 9,251,009 B2 | 2/2016 | Ben-Or et al. | |
| 9,256,498 B1 | 2/2016 | Leibowitz et al. | |
| 9,268,648 B1 | 2/2016 | Barash et al. | |
| 9,317,686 B1 | 4/2016 | Ye et al. | |
| 9,710,294 B2 | 7/2017 | Kedem et al. | |
| 9,817,729 B2 | 11/2017 | Kedem et al. | |

(Continued)

FOREIGN PATENT DOCUMENTS

WO      2021/016270 A1      1/2021

OTHER PUBLICATIONS

Tang, F., Ma, B., Li, J., Zhang, F., Su, J., & Ma, J. (2020). RansomSpector: An introspection-based approach to detect crypto ransomware. Computers & Security, 97, 101997 (Year: 2020).*

(Continued)

*Primary Examiner* — Yin Chen Shaw
*Assistant Examiner* — Nicholas Joseph Diluzio
(74) *Attorney, Agent, or Firm* — Trop, Pruner & Hu, P.C.

(57)      ABSTRACT

In some examples, a system applies an inline detection of a write of data in a storage, the inline detection to detect potential data encryption of the data. In response to an indication of the potential data encryption, the system creates a first object that represents a first version of the data, and applies a further analysis to determine whether the potential data encryption constitutes unauthorized data encryption, the further analysis based on the first object and a second object that represents a second version of the data that is prior to the first version of the data.

20 Claims, 4 Drawing Sheets

(56)  References Cited

U.S. PATENT DOCUMENTS

| | | | | |
|---|---|---|---|---|
| 9,892,005 | B2 | 2/2018 | Kedem et al. | |
| 10,009,360 | B1 | 6/2018 | Todd et al. | |
| 10,229,269 | B1 * | 3/2019 | Patton | G06F 21/554 |
| 10,303,877 | B2 | 5/2019 | Roguine et al. | |
| 10,346,258 | B2 | 7/2019 | Sella et al. | |
| 10,621,346 | B1 * | 4/2020 | Singh | H04L 9/3239 |
| 10,735,448 | B2 * | 8/2020 | Kesin | G06N 7/01 |
| 11,055,411 | B2 * | 7/2021 | Strogov | G06F 16/122 |
| 11,144,638 | B1 * | 10/2021 | Golden | G06F 21/566 |
| 11,256,529 | B2 | 2/2022 | Kedem et al. | |
| 11,349,855 | B1 * | 5/2022 | Amit | G06F 9/547 |
| 11,520,907 | B1 * | 12/2022 | Borowiec | G06F 3/067 |
| 11,921,589 | B2 * | 3/2024 | Shemer | G06F 16/188 |
| 2012/0023489 | A1 * | 1/2012 | Motta | G06F 8/65 |
| | | | | 717/170 |
| 2017/0083540 | A1 | 3/2017 | Mamluk et al. | |
| 2017/0223031 | A1 | 8/2017 | Gu et al. | |
| 2017/0366563 | A1 | 12/2017 | Volfman et al. | |
| 2018/0034835 | A1 | 2/2018 | Iwanir et al. | |
| 2018/0248896 | A1 | 8/2018 | Challita et al. | |
| 2019/0005235 | A1 * | 1/2019 | Klonowski | G06F 21/6218 |
| 2019/0108340 | A1 * | 4/2019 | Bedhapudi | G06F 21/554 |
| 2019/0130097 | A1 * | 5/2019 | Berler et al. | G06F 21/552 |
| 2020/0250522 | A1 * | 8/2020 | Meiri | G06N 3/08 |
| 2020/0319979 | A1 * | 10/2020 | Kulaga | G06F 11/3006 |
| 2020/0342104 | A1 | 10/2020 | Palisse et al. | |
| 2021/0044604 | A1 * | 2/2021 | Annen | G06F 21/565 |
| 2021/0103490 | A1 * | 4/2021 | LeCrone | G06F 11/0772 |
| 2021/0203690 | A1 * | 7/2021 | Nunes | G06N 3/088 |
| 2021/0240828 | A1 * | 8/2021 | Gaurav | G06F 16/2365 |
| 2021/0334374 | A1 * | 10/2021 | Vasudeva | G06F 21/554 |
| 2021/0336968 | A1 * | 10/2021 | Bender | H04L 63/145 |
| 2021/0409425 | A1 * | 12/2021 | Varshney | G06F 21/602 |
| 2022/0222041 | A1 * | 7/2022 | Zhang | G06N 3/08 |
| 2023/0229675 | A1 * | 7/2023 | Hautyunyan | H04L 41/0823 |
| | | | | 707/737 |
| 2023/0273999 | A1 * | 8/2023 | Nazari | G06F 21/566 |
| | | | | 726/23 |

OTHER PUBLICATIONS

Cosma Shalizi, "Shannon Entropy and Kullback-Leibler Divergence", Advanced Probability II, Chapter 28, 2006, (course lecture notes), 8 pages, <https://www.stat.cmu.edu/~cshalizi/754/2006/notes/lecture-28.pdf>.

Kharraz et al., "Unveil: A Large-Scale, Automated Approach to Detecting Ransomware", 25th {USENIX} Security Symposium ({USENIX} Security 16), 2016, 16 pages, <https://www.ftc.gov/es/system/files/documents/public_comments/2016/10/00027-129040.pdf>.

Rubrik, "Accelerate Ransomware Recovery", available online at <https://www.rubrik.com/solutions/ransomware-recovery>, Aug. 23, 2021, 15 pages.

Rubrik, "Recover Faster From Ransomware", available online at <available online at <https://web.archive.org/web/20210604201541/https://www.rubrik.com/products/polaris-overview/polaris-radar>, Jun. 4, 2021, 8 pages.

SDMagazine, "Ransomware Protection Market worth 17.36 Billion USD by 2021", available online at <<https://sd-magazine.com/securite-numerique-cybersecurite/ransomware-protection-market-worth-17-36-billion-usd-by-2021>, Feb. 7, 2017, 4 pages.

Stonefly, "StoneFly Ransomware Protection Solutions,", available online at <https://www.rubrik.com/solutions/ransomware-recovery>, Aug. 23, 2021, 8 pages.

Wu et al., "Local Shannon entropy measure with statistical tests for image randomness", Information Sciences 222, 2013, 20 pages.

Tang et al., "RansomSpector: An introspection-based approach to detect crypto ransomware", 2020, Computers & Security, vol. 97, 2020, pp. 1-14.

Anomaly Detection, "Proactively Detect and Investigate Ransomware", available online at <http://web.archive.org/web/20250613124532/https://www.rubrik.com/products/anomaly-detection>, Jun. 13, 2025, 5 pages.

Sam Curry, "Report: Ransomware Attacks and the True Cost to Business", Jun. 16, 2021, available online at <http://web.archive.org/web/20220415192852/https://www.cybereason.com/blog/research/report-ransomware-attacks-and-the-true-cost-to-business>, 6 pages.

* cited by examiner

DATA ENCRYPTION DETECTION

BACKGROUND

A ransomware attack involves encrypting data on a computer or on multiple computers connected over a network. In a ransomware attack, data can be encrypted using an encryption key, which renders the data inaccessible by users unless a ransom is paid to obtain the encryption key. A ransomware attack can be highly disruptive to enterprises, including businesses, government agencies, educational organizations, individuals, and so forth.

BRIEF DESCRIPTION OF THE DRAWINGS

Some implementations of the present disclosure are described with respect to the following figures.

Figure 1:
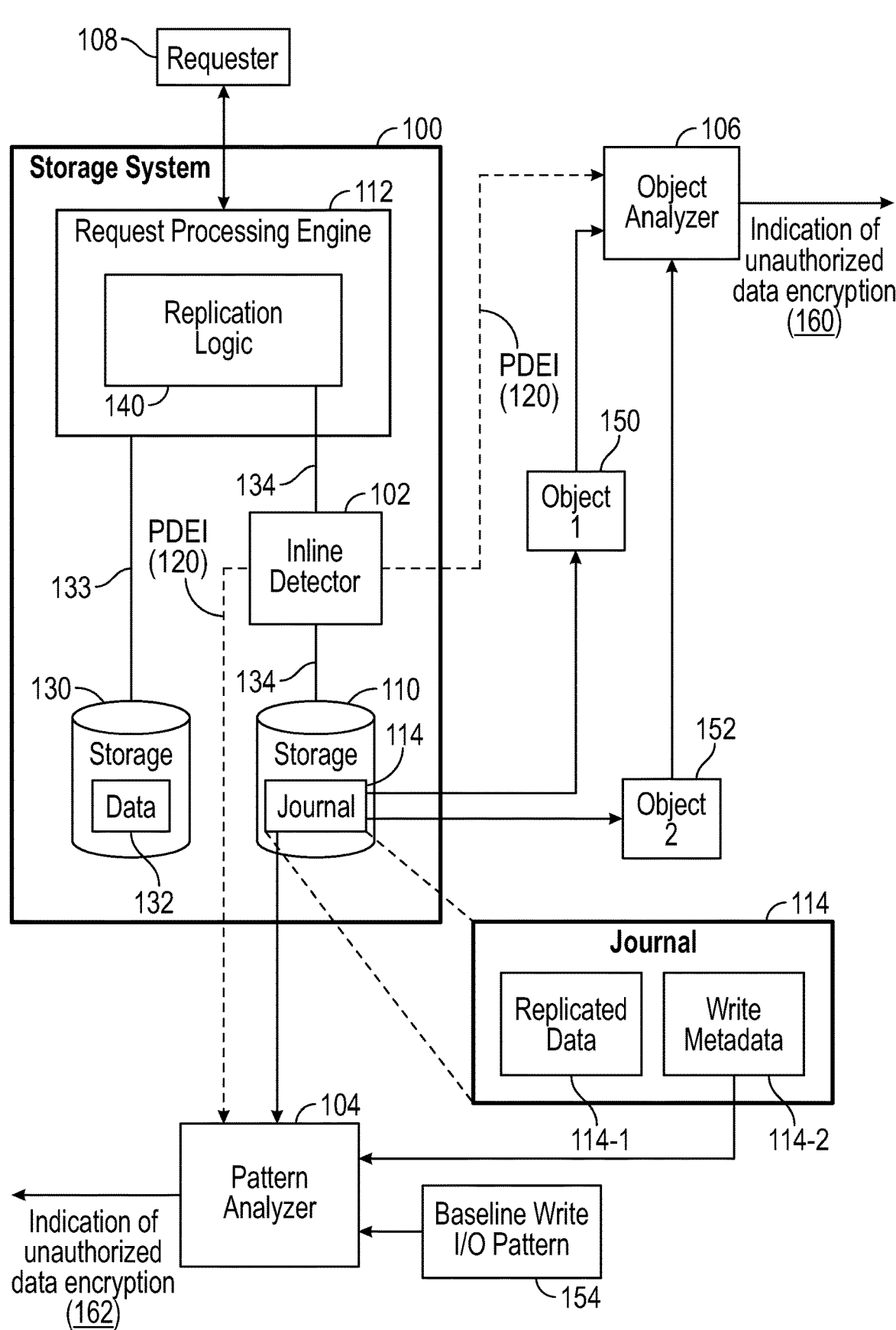
FIGS. 1 and 2 are block diagrams of arrangements including various components for detecting unauthorized encryption of data, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A ransomware attack can be difficult to detect. By the time an enterprise becomes aware of the attack, most or all of the data has been encrypted and thus inaccessible. A ransomware attack can be difficult to detect because normal computer operations may also encrypt data, so that distinguishing between authorized and unauthorized encryption of data can be challenging.

Enterprises may attempt to protect themselves from ransomware attacks by backing up their data to backup storage systems. However, ransomware attacks often first attack a backup storage system to encrypt data on the backup storage system, before encrypting data on computer(s), so that both data in the backup storage system and on the computer(s) become inaccessible.

Although reference is made to ransomware attacks in some examples, it is noted that there may be other sources of unauthorized data encryption in other examples, either caused by malware or other unauthorized entities (humans, programs, or machines). An "unauthorized data encryption" refers to a data encryption in which data has been encrypted by any entity that is not allowed to or supposed to perform the encryption.

Anti-malware programs rely on signatures of malware to detect whether the malware is present in a computer. However, an anti-malware program may attempt to remove malware after the malware has already infected the computer. Anti-malware programs may not be able to detect the presence of a ransomware attack, or may detect the ransomware attack too late in the process to prevent damage and significant loss of data.

In accordance with some implementations of the present disclosure, unauthorized data encryption activity is detected using multi-stage data encryption detection, which performs an inline detection to detect potential encryption of data in writes to a storage (e.g., containing a log or other repository of data), and in response to detecting the potential encryption of data, performs a further analysis to confirm whether the potential encryption of data detected by the inline detection constitutes an unauthorized data encryption. In some examples, the further analysis includes an object analysis of multiple objects including a first object created in response to detecting the potential encryption of data, and a second object created prior to the detection of the potential encryption of data, where the first and second objects represent different versions of the data. In further examples, the further analysis includes a pattern analysis of a pattern in input/output (I/O) operations. Details of the object analysis and pattern analysis are discussed further below.

FIG. 1 is a block diagram of an example arrangement that includes an inline detector 102, a pattern analyzer 104, and an object analyzer 106. Although depicted as three separate components, it is noted that in some examples, any two or more of the components 102, 104, and 106 can be combined into fewer components, or can be separated into additional components.

Also, in other examples, the pattern analyzer 104 or the object analyzer 106 can be omitted.

Each of the components 102, 104, and 106 can be implemented using a hardware processing circuit (or multiple hardware processing circuits), which can include any or some combination of a microprocessor, a core of a multi-core microprocessor, a microcontroller, a programmable integrated circuit, a programmable gate array, or another hardware processing circuit. Alternatively, each of the components 102, 104, and 106 can be implemented using a combination of a hardware processing circuit (or multiple hardware processing circuits) and machine-readable instructions (software and/or firmware) executable on the hardware processing circuit(s).

The inline detector 102, the pattern analyzer 104, and the object analyzer 106 can be part of the same computer system, or alternatively, can reside on multiple computer systems. In some cases, the inline detector 102, the pattern analyzer 104, and the object analyzer 106 can be present in disparate geographical locations.

As shown in FIG. 1, a requester 108 can issue requests to access (read or write) data in a storage 130. As used here, a "storage" can be implemented using a collection of storage devices, which can include a single storage device or multiple storage devices. As used here, a "collection" of elements can refer to a single element or multiple elements.

A "storage device" can refer to a disk-based storage device, a solid-state drive, a memory device, and/or any other type of component that is capable of storing data.

The requester 108 can refer to a user, a program, or a machine (e.g., a computer, a smartphone, or any other type of electronic device). A program can execute in an electronic device. A user can use an electronic device. In some examples, the requester 108 can include a virtual machine (VM). A VM emulates a physical machine and executes in an environment provided by a virtual machine monitor (VMM) or hypervisor. The VMM or hypervisor virtualizes physical hardware of a physical computer system for use by VM(s) in the physical computer system.

The requester 108 can send read and write requests to a storage system 100. The storage system 100 includes a request processing engine 112 to process requests issued by requesters, including the requester 108. An "engine" can refer to a hardware processing circuit (or multiple hardware processing circuits) or a combination of a hardware processing circuit (or multiple hardware processing circuits) and machine readable instructions.

In some examples, the request processing engine 112 can include a storage controller that can respond to access requests by managing read and write access of the storage 130. As another example, the request processing engine 112 can be a server computer (or a collection of server computers) that can respond to access requests from requesters by submitting corresponding requests to a storage controller, such as over a network, including a local area network (LAN), a wide area network (WAN), a storage area network (SAN), or any other type of network. In examples where the request processing engine 112 includes server computer(s), the request processing engine 112 can be outside of the storage system 100.

In response to a read request from the requester 108, the request processing engine 112 causes a read of data 132 stored in the storage 130. In response to a write request from the requester 108, the request processing engine 112 causes a write of data to the storage 130.

In some examples, the request processing engine 112 can include a replication logic 140 that is to protect data of a requester, such as the requester 108. Protecting data can refer to protecting the data from loss due to a failure or another fault, such as in any part of the storage system 100 (e.g., in the storage 130, or in the request processing engine 112, or in a communication path, or any other component) that results in corruption or other loss of the data 132 (or portion of the data 132) or a failure in completing a write operation to the storage 130.

In some examples, the replication logic 140 can be implemented with a portion of the hardware processing circuit(s) of the request processing engine 112, or alternatively, with machine-readable instructions executable by the request processing engine 112. In other examples, the replication logic 140 is separate from the request processing engine 112.

In some examples, in response to write requests from the requester 108, the replication logic 140 can replicate data associated with the write requests. Moreover, the replication logic 140 can log write metadata associated with the write requests. Replicating data can refer to creating a copy of a version of data, such as a copy of a write data being written by a write request, a copy of a version of data prior to a write operation for the write request, and so forth.

The replicated data is written by the replication logic 140 over a data path 134 to a storage 110, which stores a journal 114 that contains logs of information associated with write requests. The data path 134 is for writing logs of write operations to the journal 114. The data path 134 is separate from a data path 133 for writes (initiated by requesters) to the data 132 stored in the storage 130.

The journal 114 can include replicated data 114-1 and write metadata 114-2 provided by the replication logic 140. "Replicated data" refers to a copy of a version of a portion of the data 132 in the storage 130. The replicated data 114-1 can include write data associated with write requests. For example, the replicated data 114-1 can include data checkpoints, where each data checkpoint can include a version of data at a respective point in time. Data checkpoints can be taken at respective different timepoints along a checkpoint timeline, in response to any of various events: a change in data, a time event, and so forth. Thus, as the data 132 in the storage 130 changes over time due to writes, the data checkpoints stored in the replicated data 114-1 can include different versions of the data at different timepoints. This allows data recovery to any specific point in time in case of data loss.

More generally, the replicated data 114-1 in the journal 114 can include other types of backup data that can be used for recovering lost data.

The write metadata 114-2 includes a log of write requests issued by requesters (including the requester 108) to the storage system 100. The write metadata 114-2 can include identifiers of storage volumes, locations (e.g., logical addresses) of the storage volumes in the storage 130, timestamps associated with writes to the storage volumes, and/or other metadata. A "storage volume" includes a logical unit of data and can contain a portion of the data 132 in the storage 130. In other examples, the write metadata 114-2 can refer to other types of data units, such as blocks, chunks, files, and so forth.

Although FIG. 1 shows the storage 110 as being separate from the storage 130 that stores the data 132, in other examples, the journal 114 can be stored in the same storage as the data 132.

There may be multiple journals 114 in the storage 110, where each journal 114 can be associated with a respective requester (or group of requesters). Thus, data for different requesters (or groups of requesters) can be protected using different corresponding journals 114.

In some examples, the journal 114 can be used to recover data in case of a failure or other fault in the system that results in loss of data (e.g., 132 in the storage 130).

The inline detector 102 is placed "inline" with a data stream in the data path 134 between the request processing engine 112 and the storage 110. The inline detector 102 is "inline" with the data path 134 if the inline detector 102 is able to receive in real time the replicated data that is being written to the journal 114.

The inline detector 102 receives the replicated data of the data path 134 in "real time" if the inline detector 102 receives the replicated data within a predetermined amount time of the replicated data being transmitted from the request processing engine 112 to the storage 110, where the predetermined amount time can be less than 10 seconds, or 5 seconds, or 1 second, or 100 milliseconds (ms), or 50 ms, or 10 ms, or 1 ms, and so forth.

The inline detector 102 is able to process the replicated data that is provided from the request processing engine 112 to the storage 110, to detect potential data encryption of the replicated data sent from the request processing engine 112 to the storage 110. Note that encryption of the replicated data sent from the request processing engine 112 to the storage 110 can result from a malware attack (e.g., a ransomware attack) in which the malware attempts to encrypt both the data 132 in the storage 130 as well as any backup data, including the replicated data in the journal 114.

The potential data encryption detected by the inline detector 102 may not be data encryption caused by an unauthorized entity such as malware. For example, the potential data encryption may be data encryption performed by authorized entities, such as programs, machines, or users, as part of normal operations of a system (e.g., a computer, a storage system, a communication node, etc.). As another example, the potential data encryption detected by the inline detector 102 may not actually be data encryption, but a change in data performed by a different type of operation that is authorized.

To confirm that the potential data encryption detected by the inline detector 102 is in fact an unauthorized data encryption, a multi-stage data encryption detection is performed. The multi-stage data encryption detection employs the inline detector 102 in the first stage, followed by analysis using the object analyzer 106 and/or the pattern analyzer 104 in a further stage (or multiple further stages).

In response to detecting the potential data encryption, the inline detector 102 can send a potential data encryption indication (PDEI) 120 to the pattern analyzer 104 and the object analyzer 106. The PDEI 120 can be in the form of a message, an information element, a signal, or any other type of indicator. The PDEI 120 can be sent as a message over a network, a message or other indicator through an application programming interface (API), an inter-process interface, or any other type of interface. The PDEI 120 sent to the pattern analyzer 104 and/or the object analyzer 106 can trigger the pattern analyzer 104 and/or the object analyzer 106 to perform further analysis to confirm that an unauthorized data encryption has occurred.

Inline Detector Analysis

The inline detector 102 applies a statistical analysis that uses observed (absolute) data entropy to detect potential data encryption. An example of the observed data entropy is Shannon entropy, which is a measure of the uncertainty or variability associated with a random variable. Shannon entropy quantifies the expected value of information contained in a message.

Data in the data path from the request processing engine 112 to the storage 110 is sampled at various time intervals (e.g., periodically, randomly, or in response to specified events) as the data is streamed to the storage 110. For each sample of K blocks, each block of size T, a measure according to a Shannon entropy is computed for each block of the K blocks, where K 1, and T is a predefined value. In such examples, Shannon entropy quantifies the expected value of information contained in each block of the K blocks.

The Shannon entropy measures for the K blocks are collected into a list of entropy measures. The list of entropy measures is used as an input to a statistical test (e.g., T-test, or another statistical test) to determine whether the observed entropy measures match a list of statistically expected entropy measures for a strongly encrypted block of size T with a target confidence. In other words, the expected entropy measures are entropy measures that would be expected if data were encrypted. The expected entropy values are precomputed ahead of time.

A T-test can be used if there is a significant difference between the means of two groups of measures, which in some examples of the present disclosure include (1) the list of Shannon entropy measures computed for the K blocks of a respective sample, and (2) the list of precomputed expected entropy values. If the mean of the Shannon entropy measures in the list of Shannon entropy measures computed for the K blocks is similar to the mean of the precomputed expected entropy values to within a specified threshold, then that indicates that potential data encryption has been detected by the inline detector 102. On the other hand, if the mean of the Shannon entropy measures in the list of Shannon entropy measures computed for the K blocks differs from the mean of the precomputed expected entropy values by greater than the specified threshold, then that indicates no potential data encryption has been detected by the inline detector 102.

In a further example, an incoming data stream for a write of an object is sampled at random intervals. The inline detector 102 collects in a buffer N (N≥2) bytes that are randomly sampled. The inline detector 102 creates an empty histogram with a specified quantity (e.g., 256) of buckets, assuming all possible byte values may be present (one bucket per possible byte value). The inline detector 102 populates the histogram with respective bucket counts of the byte values from the sample. The inline detector 102 converts each bucket count into a probability of appearance of the byte in the buffer by dividing the bucket count by N. The conversion produces a probability vector, where each entry of the vector is a probability of occurrence of the corresponding byte value.

The inline detector 102 calculates an entropy of the resulting probability vector using Shannon's formula. The inline detector 102 collects the resulting value into an entropy vector. After a predefined number of entropy values have been collected into the entropy vector, the entropy vector is used as an input into a T-test, to establish whether it is statistically significant to assume that the resulting entropy vector has been drawn out of an encrypted data population.

In other examples, instead of comparing means, other statistical comparisons of the list of Shannon entropy measures computed for the K blocks and the list of precomputed expected entropy values can be performed.

Once N (N≥1 or 2) consecutive samples (where each sample has K blocks of data) test positive for encryption using the statistical test as noted above, the PDEI 120 can be set, and the inline detector 102 can send the PDEI 120 to the pattern analyzer 104 and/or the object analyzer 106.

The variables K, T, and N are tunable parameters that can be derived from empirical or experimental data. In other examples, the variables can be adjusted using machine learning as data patterns are observed.

Object Analyzer Analysis

In response to receiving the PDEI 120, the object analyzer 106 can perform an independent assessment of whether the potential data encryption indicated by the inline detector 102 constitutes unauthorized data encryption. The analysis performed by the object analyzer 106 is based on multiple objects, including a first object 150 and a second object 152. The first and second objects 150 and 152 represent different versions of data in the journal 114. The second object 152 represents a version of data that is prior in time to the first version of data represented by the first object 150. In some examples, the first and second objects 150 and 152 are different snapshots of data in the journal 114. A "snapshot" of data refers to a copy of data that was generated at a respective time.

For example, the second version of the data represented by the second object 152 is a version prior to the potential data encryption indicated by the inline detector 102, while the first version of data represented by the first object 150 is after the potential data encryption indicated by the inline detector 102. In other words, the first object 150 contains data that may potentially be corrupted, while the second object 152 contains data that has not been potentially corrupted by the potential data encryption.

In some examples, the object analyzer 106 may create the first object 150 or request that the first object 150 be created (such as by taking a snapshot of a portion of the replicated data 114-1 in the journal 114), in response to the PDEI 120 from the inline detector 102.

An "object" can refer any separately identifiable unit of data in the journal 114. For example, an object can include a data checkpoint. In examples where the journal 114 includes multiple data checkpoints, the first and second objects 150 and 152 include different data checkpoints along a checkpoint timeline.

The object analyzer 106 compares a suspect object (e.g., the first object 150) flagged by the inline detector 102 to a prior object (e.g., the second object 152).

Although reference is made to comparing two objects, it is noted that the object analyzer 106 can compare more than two objects in other examples. For example, the object analyzer 106 can compare a first group of objects containing data after the potential data encryption with a second group of objects containing data prior to the potential data encryption.

The object analyzer 106 can use statistical and/or machine learning techniques. An example of a statistical technique includes performing a relative entropy calculation between the two objects to measure a difference between the two versions of data represented by the first and second objects 150 and 152. An example of relative entropy is Kullback-Leibler divergence, which represents statistical distance that measures how a first probability distribution is different from a second probability distribution.

An incoming data stream for a write of an object is sampled at random intervals. The object analyzer 106 collects in a buffer N (N≥2) bytes that are randomly sampled. The object analyzer 106 creates an empty histogram with a specified quantity (e.g., 256) of buckets, assuming all possible byte values may be present (one bucket per possible byte value). The object analyzer 106 populates the histogram with respective bucket counts of the byte values from the sample. The object analyzer 106 converts each bucket count into a probability of appearance of the byte in the buffer by dividing the bucket count by N. The conversion produces a probability vector, where each entry of the vector is a probability of occurrence of the corresponding byte value. The probability vector is an example of a probability distribution. Two probability vectors are computed for the two objects with respect to which the relative entropy is to be calculated.

A divergence (relative entropy) between the first and second probability distributions (e.g., first and second probability vectors) is determined. If the divergence (relative entropy) exceeds a specified threshold, then the object analyzer 106 can output an indication that unauthorized data encryption is present. This indication is depicted as an indication of unauthorized data encryption 160 in FIG. 1.

The indication of unauthorized data encryption 160 can be transmitted by the object analyzer 106 to a target entity, such as to an administrator, to a program, or to a machine. Note that in some examples, the encrypted object 150 (or an identifier of the encrypted object 150) may also be transmitted to the target entity. On the other hand, if the divergence (relative entropy) does not exceed the specified threshold, then that indicates that unauthorized data encryption has not occurred, and the object analyzer 106 may cause removal or deletion of the first object 150. In response to the indication of unauthorized data encryption 160 from the object analyzer 106, the target entity can initiate a remediation action to counter the unauthorized data encryption (which can be due to a ransomware attack). The remediation action can include shutting down the storage system 100, disabling network communication with the storage system 100, and so forth.

The relative entropy calculation indicates whether an increase of entropy per object is evident, which indicates that data encryption has occurred.

As the relative entropy calculation is computationally intensive, the calculation can be performed by the object analyzer 106 on a system separate from the storage system 100.

In further examples, the object analyzer 106 can apply a hash function on the first and second objects 150 and 152. The hash function applied on the first object 150 produces a first hash value, and the hash function applied on the second object 152 produces a second hash value. The object analyzer 106 compares the first and second hash values. The difference between the hash values of the two different objects provides an indication of a "distance" between the data versions represented by the first and second objects 150 and 152, where a larger distance (e.g., larger difference in hash values) indicates that more change has occurred, which is indicative of unauthorized data encryption. For example, if the first and second hash values differ by greater than a specified threshold, then that indicates unauthorized data encryption has occurred. If the first and second hash values do not differ by greater than the specified threshold, then that indicates unauthorized data encryption has not occurred.

In other examples, the first and second objects 150 and 152 are fed as inputs to a machine learning model. The machine learning model can be trained using training data that includes objects subject to unauthorized data encryption, and objects not subject to unauthorized data encryption. The objects in the training data are labelled as encrypted or not encrypted, so that the machine learning model can learn how an encrypted object differs from an unencrypted object. The trained machine learning model can produce an output based on the first and second objects 150 and 152, where the output includes an indication of whether or not unauthorized data encryption has occurred.

Pattern Analyzer Analysis

In response to receiving the PDEI 120, the pattern analyzer 104 can perform an independent assessment (in addition to or instead of the analysis by the object analyzer 106) of whether the potential data encryption indicated by the inline detector 102 constitutes unauthorized data encryption.

The pattern analyzer 104 does not analyze the actual data, but rather, analyzes a write I/O pattern that can be discerned from the write metadata 114-2 in the journal 114. The pattern analyzer 104 can determine if a write I/O pattern deviates from a baseline write I/O pattern 154 by more than a specified threshold. For example, relative entropy such as a Kullback-Leibler divergence can be computed between the write I/O pattern determined from the write metadata 114-2 and the baseline write I/O pattern 154. If a measure of the divergence is greater than the specified threshold, then the pattern analyzer 104 can indicate presence of an unauthorized data encryption. The pattern analyzer 104 can send an indication of the unauthorized data encryption 162 to a target entity, which can initiate a remediation action. In other examples, the pattern analyzer 104 may use other indications of differences between a write I/O pattern determined from the write metadata 114-2 and the baseline write I/O pattern 154 to detect whether unauthorized data encryption is present.

The baseline write I/O pattern 154 may be derived by an entity (e.g., a human, a program, or a machine) based on historical write operations to the storage 130 (and/or to any other storage or group of storages).

A write I/O pattern can refer to any collection of write operations performed with respect to storage volumes (or other types of data units) in the storage 130, where the collection of write operations exhibits a spatial and/or a temporal pattern, or any other type of pattern. For example, the collection of write operations can be made with respect to certain storage volumes as identified by storage volume identifiers and locations in the write metadata 114-2. The pattern analyzer 104 may derive a first spatial pattern of write operations with respect to storage volumes in the storage 130 based on the write metadata 114-2 in the journal 114. The baseline write I/O pattern 154 may indicate a second spatial pattern. If the first spatial pattern and the second spatial pattern have a divergence that exceeds a threshold, then the pattern analyzer 104 may output an indication of unauthorized data encryption.

As a further example, the write operations in the collection of write operations can perform writes to storage volumes that have temporal characteristics according to timestamps associated with the write operations (e.g., the timestamps of write requests are stored in the write metadata 114-2). As examples, the timestamps in the write metadata 114-2 may indicate that writes to storage volumes within a given group of storage volumes may occur on average a first difference in time ΔT1 apart. The baseline write I/O pattern 154 may indicate that, historically, that writes to storage volumes within the given group of storage volumes (and/or other group(s) of storage volumes) may occur on average a second difference in time ΔT2 apart. If ΔT1 is less than ΔT2 by some specified time difference threshold, then that may indicate that unauthorized data encryption is occurring since data encryption is being performed to storage volumes at a greater frequency than normal.

In other examples, the pattern analyzer 104 can use both differences in temporal patterns and spatial patterns in determining whether unauthorized data encryption is present.

In some examples, the pattern analyzer 104 is applied to the journal 114, rather than to data in-flight (in real time) through the data path 134 between the request processing engine 112 and the storage 110. Applying pattern analysis on the data in real time can be costly. However, since the journal 114 logs all write operations, the pattern analyzer 104 can perform its analysis of the journal 114, which is not part of the time-sensitive data path.

In further examples, the pattern analyzer 104 can use machine learning to determine whether or not a write I/O pattern indicated by the write metadata 114-2 is indicative of unauthorized data encryption. A machine learning model can be trained using training data to learn write I/O patterns that are indicative of unauthorized data encryption. Note that the machine learning model does not look at the write data, but rather, analyzes the pattern (spatial and/or temporal) of write operations to the storage 130.

Further Examples

Figure 2:
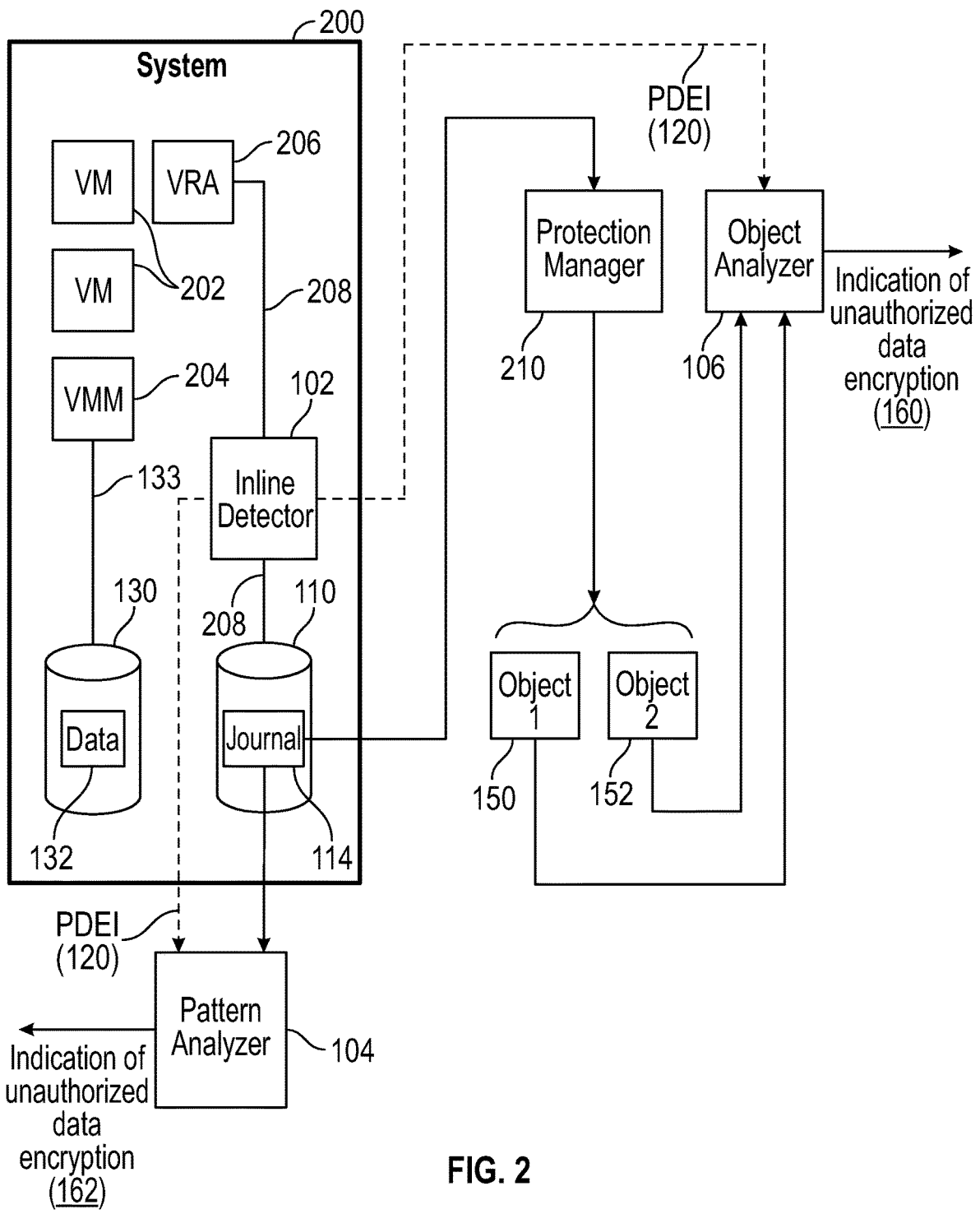

FIG. 2 shows another example arrangement according to further examples of the present disclosure. A system 200 includes VMs 202 that execute in the system 200. The system 200 can be implemented using a computer or a collection of computers.

Each VM contains an application program (or multiple application programs) and a guest operating system (OS) (not shown). The application programs in the VMs 202 and/or the guest OSes can issue requests to access data in the storage 130. In the example of FIG. 2, a VM 202 is an example of the requester 108 of FIG. 1. Each VM 202 is able to issue access requests (read or write requests) for the data 132 in the storage 130.

The system 200 also includes a VMM 204 (also referred to as a hypervisor) which virtualizes physical resources (including processing resources, storage resources, input/output (I/O) resources, communication resources, etc.) of the system 200, to make such physical resources available to the VMs 202.

In some examples, an access request for the data 132 in the storage 130 issued from a VM 202 is intercepted by the VMM 204, which manages the access of the data 132 in storage 130.

The system 200 also includes a virtual replication appliance (VRA) 206, which is an example of the replication logic 140 of FIG. 1. In some examples, the VRA 206 can also be a VM that performs tasks similar to those of the replication logic 140 of FIG. 1. The VRA 206 manages the replication of data from protected VMs 202 to the journal 114 in the storage 110. A "protected VM" can refer to a VM in the system 200 whose data is protected from loss by the VRA 206. Note that some of the VMs 202 may not be protected VMs, in which case the VRA 206 does not replicate data for such unprotected VM(s).

A data path 208 is provided between the VRA 206 and the storage 110 over which replicated data is provided to the storage 110. In some examples, if the VRA 206 is a VM, then the data path 208 also includes a path through the VMM 204. The journal 114 contains similar content as the journal in FIG. 1 (the replicated data 114-1 and the write metadata 114-2).

Similar to FIG. 1, the inline detector 102 is provided to perform inline analysis of a stream of data over the data path 208 to detect potential data encryption. In response to detecting potential data encryption, the inline detector 102 issues the PDEI 120 to the object analyzer 106 and the pattern analyzer 104.

FIG. 2 further depicts a protection manager 210. The protection manager 210 can execute in a system that is separate from the system 200. In some examples, the protection manager 210 is responsible for disaster recovery of data in case of loss of data in the system 200. For example, the protection manager 210 can perform replication of objects, including the objects 150 and 152, from the journal 114 to a storage site that is remote from the system 200. In some examples, the protection manager 210 can take snapshots of the content of the journal 114. The objects 150 and 152 are snapshots, for example.

In response to the PDEI 120, the object analyzer 106 can perform analysis of the objects 150 and 152, and the pattern analyzer 104 can perform I/O pattern analysis, as discussed above in connection with FIG. 1.

Figure 3:
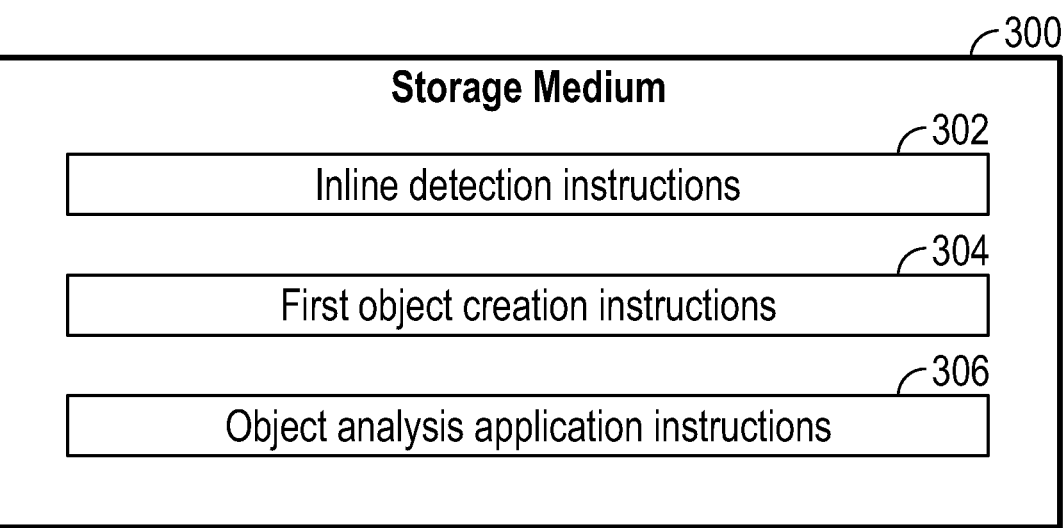
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The system can include a computer or a collection of computers.

The machine-readable instructions include inline detection instructions 302 to apply an inline detection of a write of data in a storage (e.g., 130 in FIG. 1 or 2), the inline detection to detect potential data encryption of the data. In some examples, the inline detection is applied to writes to a journal (e.g., 114 in FIG. 1 or 2) that logs writes in a storage system. In some examples, writes to the journal are over a data path (e.g., 134 in FIG. 1 or 208 in FIG. 2) that is separate from a data path (e.g., 133 in FIG. 1 or 2) for the writes between one or more requesters and the storage system. In some examples, the inline detection is based on calculation of an absolute entropy in write data.

The machine-readable instructions include first object creation instructions 304 to, in response to an indication of the potential data encryption, create a first object that represents a first version of the data.

The machine-readable instructions include object analysis application instructions 306 to apply a further analysis to determine whether the potential data encryption constitutes unauthorized data encryption, the further analysis based on the first object and a second object that represents a second version of the data that is prior to the first version of the data.

In some examples, the creating of the first object includes creating a first snapshot, and the second object includes a second snapshot created prior to the first snapshot.

In some examples, the further analysis is based on calculation of relative entropy on the first object and the second object.

In some examples, the further analysis is based on calculation of hashes of the first object and the second object.

In some examples, the further analysis is based on machine learning that produces an indication of the unauthorized data encryption based on the first object and the second object.

In some examples, the machine-readable instructions further apply an I/O pattern analysis on writes including the write, to identify whether the potential data encryption constitutes unauthorized data encryption. In some examples, the I/O pattern analysis compares a pattern of the writes to a baseline write I/O pattern derived from historical write operations.

Figure 4:
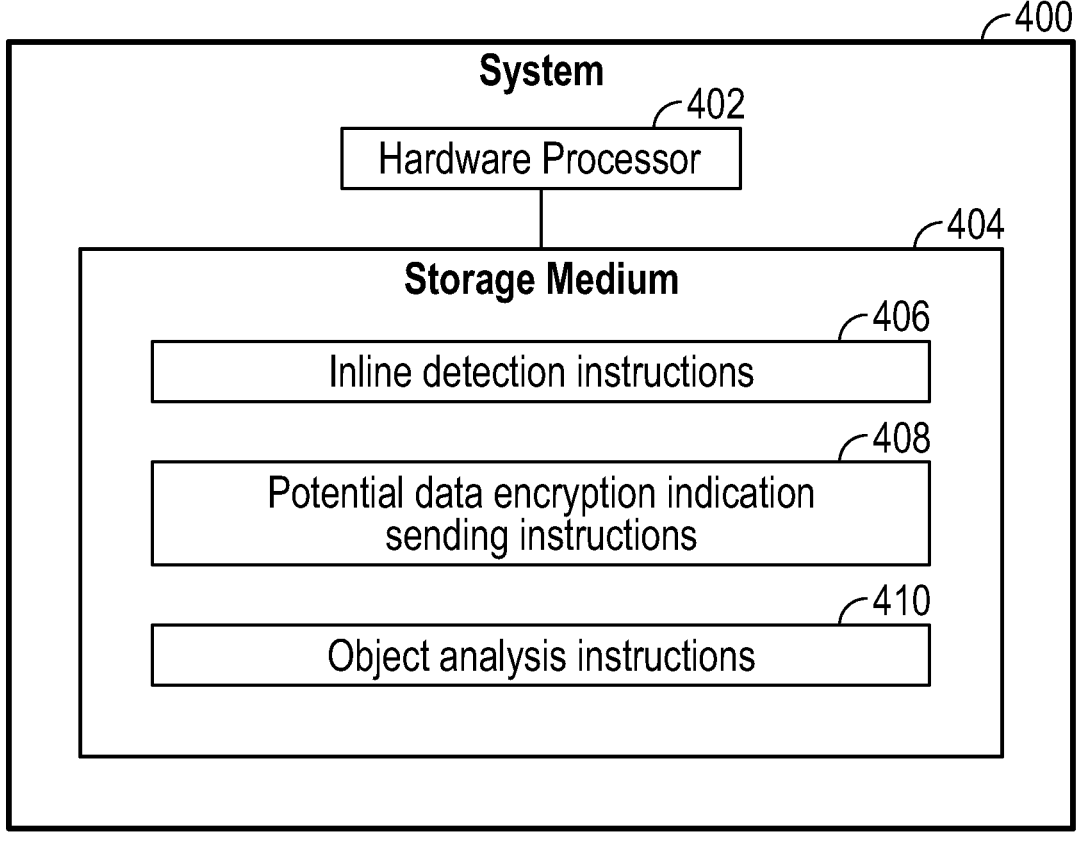
FIG. 4 is a block diagram of a system according to some examples.

FIG. 4 is a block diagram of a system 400 according to some examples. The system 400 includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The system 400 includes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions in the storage medium 404 include inline detection instructions 406 to apply, using an inline detector, an inline detection of data in a data path to a journal that logs writes to a storage. The inline detection is to detect potential data encryption.

The machine-readable instructions in the storage medium 404 include potential data encryption indication sending instructions 408 to send, from the inline detector to an object analyzer, an indication of potential data encryption (e.g., the PDEI 120 in FIG. 1 or 2).

The machine-readable instructions in the storage medium 404 include object analysis instructions 410 to, in response to the indication of potential data encryption, apply, using the object analyzer, a further analysis to determine whether the potential data encryption constitutes unauthorized data encryption. The further analysis is based on a first object and a second object, the first object representing a first version of data after occurrence of the potential data encryption, and the second object representing a second version of data that is prior to the occurrence of the potential data encryption.

Figure 5:
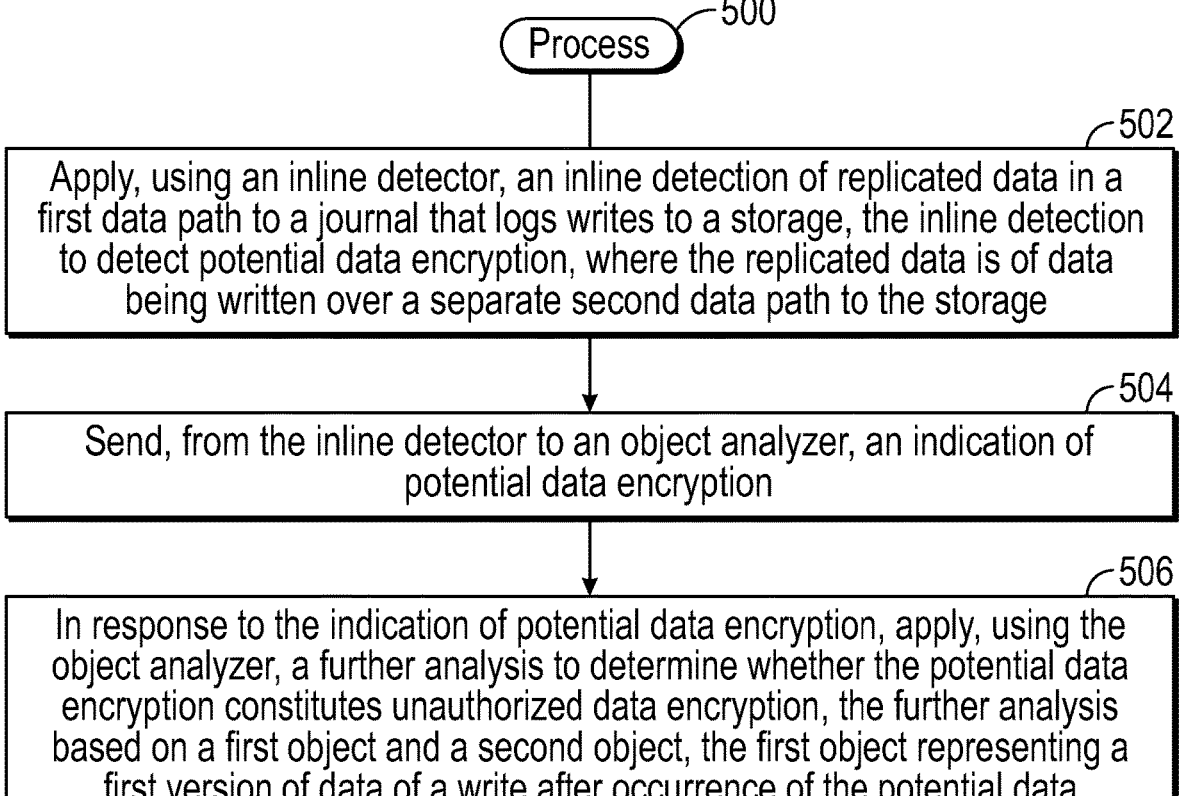
FIG. 5 is a flow diagram of a process according to some examples.

FIG. 5 is a flow diagram of a process 500 according to some examples of the present disclosure. The process 500 can be performed by a system including a hardware processor, where the system can include a computer or multiple computers.

The process 500 includes applying (at 502), using an inline detector, an inline detection of replicated data in a first data path to a journal that logs writes to a storage, the inline detection to detect potential data encryption, where the replicated data is of data being written over a separate second data path to the storage.

The process 500 includes sending (at 504), from the inline detector to an object analyzer, an indication of potential data encryption.

In response to the indication of potential data encryption, the process 500 includes applying (at 506), using the object analyzer, a further analysis to determine whether the potential data encryption constitutes unauthorized data encryption, the further analysis based on a first object and a second object, the first object representing a first version of data of a write after occurrence of the potential data encryption, and the second object representing a second version of the data of the write that is prior to the occurrence of the potential data encryption.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

apply an inline detection of a write of replicated data to a journal that logs writes in a storage system, the inline detection to detect potential data encryption of the replicated data, wherein the replicated data is a copy of data of a write request;

in response to an indication of the potential data encryption, create a first object that represents a first version of the data of the write request; and apply a further analysis to determine whether the potential data encryption constitutes unauthorized data encryption, the further analysis comprising:

calculating a first relative entropy representing a first divergence between the first object and a second object that represents a second version of the data of the write request, the second version created prior to the first version, wherein the first divergence represents a statistical distance between a probability distribution created for the first object and a probability distribution created for the second object;

determining a write input/output (I/O) pattern from write metadata for the writes, the write I/O pattern comprising one or more of a spatial I/O pattern based on locations of the writes in storage volumes, or a temporal pattern based on timestamps of the writes;

calculating a second relative entropy representing a second divergence between the determined write I/O pattern and a baseline write I/O pattern, wherein the second divergence represents a statistical distance between a probability distribution created for the determined write I/O pattern and a probability distribution created for the baseline write I/O pattern; and indicate that the potential data encryption constitutes the unauthorized data encryption responsive to the first relative entropy exceeding a first threshold and the second relative entropy exceeding a second threshold; and initiate a remediation action to counter the unauthorized data encryption.

2. The non-transitory machine-readable storage medium of claim 1, wherein the creating of the first object comprises creating a first snapshot, and the second object comprises a second snapshot created prior to the first snapshot.

3. The non-transitory machine-readable storage medium of claim 1, wherein the write of the replicated data to the journal is over a data path that is separate from a data path for the writes between one or more requesters and the storage system.

4. The non-transitory machine-readable storage medium of claim 3, wherein the journal comprises the replicated data including a data checkpoint at a first timepoint and further replicated data including a data checkpoint at a second timepoint.

5. The non-transitory machine-readable storage medium of claim 1, wherein the inline detection is based on a calculation of an absolute entropy in the replicated data.

6. The non-transitory machine-readable storage medium of claim 1, wherein the first object and the second object are in the journal.

7. The non-transitory machine-readable storage medium of claim 1, wherein the probability distribution created for the first object comprises probabilities of occurrence of respective values in the first object, and the probability distribution created for the second object comprises probabilities of occurrence of respective values in the second object.

8. The non-transitory machine-readable storage medium of claim 1, wherein the further analysis is further based on a calculation of hashes of the first object and the second object.

9. The non-transitory machine-readable storage medium of claim 1, wherein the further analysis is further based on machine learning that produces an indication of the unauthorized data encryption based on the first object and the second object.

10. The non-transitory machine-readable storage medium of claim 1, wherein the write metadata is contained in the journal, and the write metadata comprises addresses of locations in the storage volumes to which the writes are targeted, and the timestamps of the writes.

11. The non-transitory machine-readable storage medium of claim 10, wherein the baseline write I/O pattern is derived from historical write operations.

12. The non-transitory machine-readable storage medium of claim 1, wherein the further analysis further comprises applying machine learning to the determined write I/O pattern to determine whether the potential data encryption constitutes the unauthorized data encryption.

13. The non-transitory machine-readable storage medium of claim 1, wherein the remediation action is selected from among shutting down the storage system or disabling network communication with the storage system.

14. A system comprising:

a hardware processor; and a non-transitory storage medium storing instructions executable on the hardware processor to:

apply, using an inline detector, an inline detection of replicated data in a data path to a journal that logs writes to a storage, the inline detection to detect potential data encryption, wherein the replicated data is a copy of data of a write request;

send, from the inline detector to an object analyzer, an indication of the potential data encryption; and in response to the indication of the potential data encryption, apply, using the object analyzer, a further analysis to determine whether the potential data encryption constitutes unauthorized data encryption, the further analysis comprising:

calculating a first relative entropy representing a first divergence between a first object and a second object, the first object representing a first version of the data of the write request created after occurrence of the potential data encryption, and the second object representing a second version of the data of the write request, the second version created prior to the occurrence of the potential data encryption, wherein the first divergence represents a statistical distance between a probability distribution created for the first object and a probability distribution created for the second object, determining a write input/output (I/O) pattern from write metadata for the writes, the write I/O pattern comprising one or more of a spatial I/O pattern based on locations of the writes in storage volumes, or a temporal pattern based on timestamps of the writes, calculating a second relative entropy representing a second divergence between the determined write I/O pattern and a baseline write I/O pattern, wherein the second divergence represents a statistical distance between a probability distribution created for the determined write I/O pattern and a probability distribution created for the baseline write I/O pattern, and indicating that the potential data encryption constitutes the unauthorized data encryption responsive to the first relative entropy exceeding a first threshold and the second relative entropy exceeding a second threshold; and initiate a remediation action to counter the unauthorized data encryption.

15. The system of claim 14, wherein the write metadata is contained in the journal, and the write metadata comprises addresses of locations in the storage volumes to which the writes are targeted, and the timestamps of the writes.

16. The system of claim 14, wherein the further analysis by the object analyzer further comprises applying machine learning to the determined write I/O pattern to determine whether the potential data encryption constitutes the unauthorized data encryption.

17. The system of claim 14, wherein the inline detector is to calculate a measure of absolute entropy of the replicated data to detect the potential data encryption, and wherein the probability distribution created for the first object comprises probabilities of occurrence of respective values in the first object, and the probability distribution created for the second object comprises probabilities of occurrence of respective values in the second object.

18. A method executed by a system comprising a hardware processor, the method comprising:

applying, using an inline detector, an inline detection of replicated data in a first data path to a journal that logs writes to a storage, the inline detection to detect potential data encryption, wherein the replicated data is a copy of data of a write request being written over a separate second data path to the storage;

sending, from the inline detector to an object analyzer, an indication of the potential data encryption; and based on the indication of the potential data encryption, applying, using the object analyzer, a further analysis to determine whether the potential data encryption constitutes unauthorized data encryption, the further analysis comprising:

calculating a first relative entropy representing a first divergence between a first object and a second object, the first object representing a first version of the data of the write request created after occurrence of the potential data encryption, and the second object representing a second version of the data of the write request, the second version created prior to the occurrence of the potential data encryption, wherein the first divergence represents a statistical distance between a probability distribution created for the first object and a probability distribution created for the second object, determining a write input/output (I/O) pattern from write metadata for the writes, the write I/O pattern comprising one or more of a spatial I/O pattern based on locations of the writes in storage volumes, or a temporal pattern based on timestamps of the writes, calculating a second relative entropy representing a second divergence between the determined write I/O pattern and a baseline write I/O pattern, wherein the second divergence represents a statistical distance between a probability distribution created for the determined write I/O pattern and a probability distribution created for the baseline write I/O pattern, and indicating that the potential data encryption constitutes the unauthorized data encryption responsive to the first relative entropy exceeding a first threshold and the second relative entropy exceeding a second threshold; and initiating a remediation action to counter the unauthorized data encryption.

19. The method of claim 18, wherein the further analysis further comprises applying machine learning to the determined write I/O pattern to determine whether the potential data encryption constitutes the unauthorized data encryption.

20. The method of claim 18, wherein the write metadata is contained in the journal, and the write metadata comprises addresses of locations in the storage volumes to which the writes are targeted, and the timestamps of the writes.

* * * * *